United States Patent
Cheng

[19]

[11] Patent Number: 5,960,900
[45] Date of Patent: Oct. 5, 1999

[54] TORQUE COMPENSATOR FOR MOTORCYCLE

[76] Inventor: Kan Cheng, 40100 San Carlos Pl., Fremont, Calif. 94539

[21] Appl. No.: 08/878,032

[22] Filed: Jun. 18, 1997

[51] Int. Cl.$^6$ ....................................................... B60K 6/00
[52] U.S. Cl. ................................ 180/165; 180/21; 180/30
[58] Field of Search ............................ 280/217; 180/205, 180/206, 207

[56] References Cited

U.S. PATENT DOCUMENTS

| | | | |
|---|---|---|---|
| 3,756,338 | 9/1973 | Goodridge | 180/30 |
| 3,968,352 | 7/1976 | Andeen | 235/150.1 |
| 5,314,034 | 5/1994 | Chittal | 180/21 |
| 5,820,439 | 10/1998 | Hair, III | 446/233 |

*Primary Examiner*—Robert J. Oberleitner
*Assistant Examiner*—Daniel Yeagley
*Attorney, Agent, or Firm*—Jack Lo

[57] ABSTRACT

Torque is generated by the rotating front road wheel of a motorcycle for balance. When the vehicle is traveling too slowly, too little torque is generated for adequate balance, and when the vehicle is traveling too quickly, too much torque is generated for safe maneuvering. A torque compensator for a motorcycle thus includes a sensor for detecting the angular momentum of the road wheel. The detected angular momentum is compared to a predetermined optimal angular momentum by a comparator. An electric flywheel attached to the steering fork of the motorcycle is driven at a variable speed to generate a compensating angular momentum equal to the difference between the angular momentum of the road wheel and the optimal angular momentum. When the angular momentum of the road wheel is below the optimum, the flywheel is driven in the same direction as the road wheel to provide supplemental momentum, so that the sum of their momentums is equal to the optimal angular momentum. When the angular momentum of the road wheel exceeds the optimum, the flywheel is driven in the opposite direction as the road wheel to provide a counteracting momentum, so that the sum of their momentums is still equal to the optimal angular momentum. Thus the combined torque of the road wheel and flywheel is always optimized for the best stability and steering response throughout the entire speed range of the vehicle.

20 Claims, 3 Drawing Sheets

$$\vec{L} = I \times \vec{W}$$
Fig. 1
PRIOR ART
$$\vec{T} = \frac{d\vec{L}}{dt}$$
Fig. 2
PRIOR ART
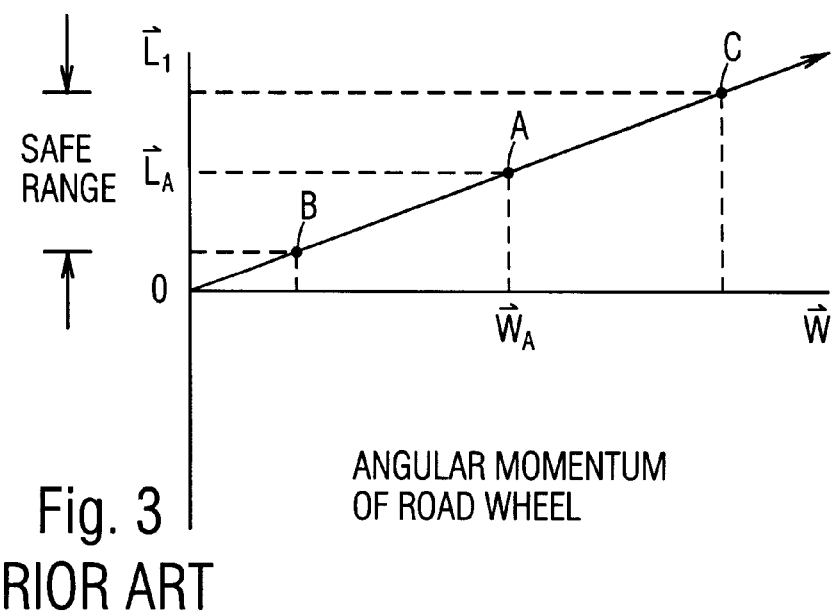
ANGULAR MOMENTUM OF ROAD WHEEL
Fig. 3
PRIOR ART
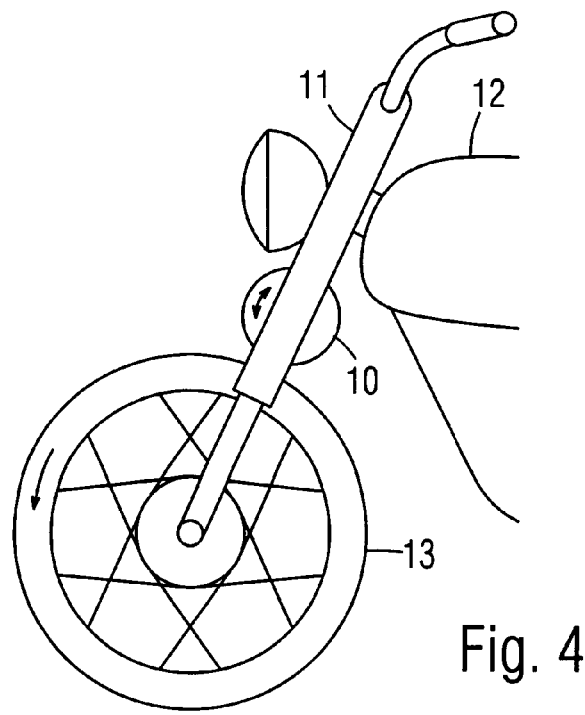
Fig. 4

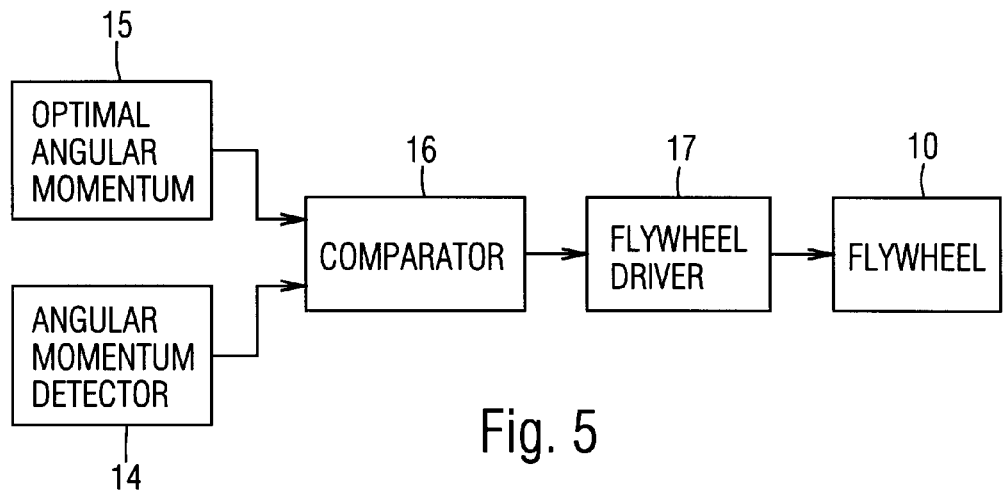
Fig. 5
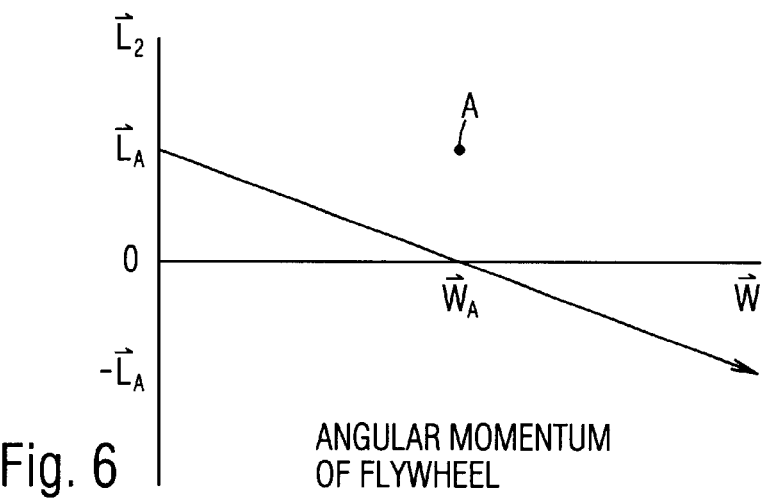
Fig. 6   ANGULAR MOMENTUM OF FLYWHEEL
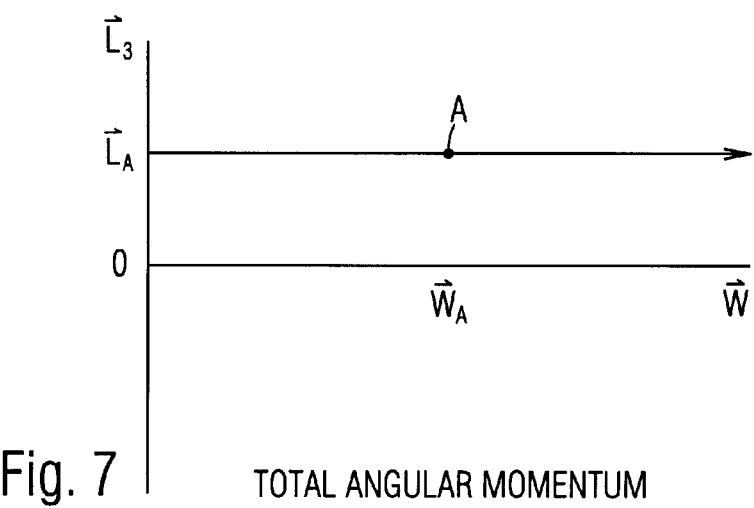
Fig. 7   TOTAL ANGULAR MOMENTUM

5,960,900

TORQUE COMPENSATOR FOR MOTORCYCLE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention:

This invention relates generally to motor vehicle stabilization devices.

2. Prior Art:

A two-wheeled vehicle, such as a motorcycle or bicycle, is balanced when torque is generated by the rotating front road wheel, and the wheel is steered properly. This is represented by the equations in FIGS. 1 and 2, where L=angular momentum of the wheel, I=moment of inertia of the wheel, W=angular velocity of the wheel, T=torque for balance, and t=time. Accordingly, the wheel's angular momentum is directly proportional to its angular velocity or rotational speed, which in turn is directly proportional to the velocity of the motorcycle, or road speed.

As shown in the graph of $L_1$ in FIG. 3, the angular momentum of the road wheel, there is a limited safe range of angular momentum between points B and C, with point A being generally where stability and steering sensitivity are optimal. If the angular momentum is in the low range below point B, i.e., when the vehicle is traveling very slowly, there is insufficient torque for proper balance. In this situation, a rider must swing the front wheel in exaggerated motions to maintain balance. When the angular momentum and torque are equal to zero, i.e., when the vehicle is stopped, the rider must put a foot on the ground to prevent the vehicle from falling on one side. If the angular momentum is in the high range above point C, i.e., when the vehicle is traveling very fast, the torque is too high. In this situation, the vehicle is either limited to a substantially straight path, or is caused to go out of control with even small steering inputs.

OBJECTS OF THE INVENTION

Accordingly an object of the present invention is to provide a torque compensator for a motorcycle that provides the optimal balancing torque regardless of the forward velocity of the vehicle.

Another object of the present invention is to provide a torque compensator for a motorcycle that provides the optimal stability and steering sensitivity throughout the entire speed range of the vehicle.

Yet another object of the present invention is to provide a torque compensator for a motorcycle that eliminates the need for a rider to put a foot on the ground when the vehicle is stopped.

Further objects of the present invention will become apparent from a consideration of the drawings and ensuing description.

BRIEF SUMMARY OF THE INVENTION

A torque compensator for a motorcycle includes a rotation sensor for sensing the angular velocity and thus the angular momentum of the front road wheel. The angular momentum of the road wheel is compared to a stored reference that represents the optimal angular momentum. A flywheel attached to the steering fork of the motorcycle is driven at a variable speed to generate a compensating angular momentum, which is equal to the difference between the angular momentum of the road wheel and the optimal angular momentum. When the angular momentum of the road wheel is less than the optimal angular momentum, i.e., when the vehicle is traveling slowly, the flywheel is driven in the same rotational direction as the road wheel to provide supplemental momentum, so that the sum of the momentums of the road wheel and the flywheel is equal to the optimal angular momentum. When the angular momentum of the road wheel is greater than the optimal angular momentum, i.e., when the vehicle is traveling quickly, the flywheel is driven in the opposite direction as the road wheel to provide a counteracting momentum, so that the sum of the momentums of the road wheel and the flywheel is again equal to the optimal angular momentum. Thus the combined torque of the road wheel and flywheel is always optimized for the best stability and steering response across the entire speed range of the vehicle.

BRIEF DESCRIPTION OF THE SEVERAL VIEWS OF THE DRAWING

FIG. 1 is a formula for angular momentum.

FIG. 2 is a formula for torque.

FIG. 3 is a graph showing the angular momentum of a road wheel of a vehicle.

FIG. 4 is a side view of a flywheel, mounted on a motorcycle, of a torque compensator in accordance with the present invention.

FIG. 5 is a block diagram of the torque compensator.

FIG. 6 is a graph showing the angular momentum of the flywheel of the torque compensator.

FIG. 7 is a graph showing the total angular momentum of the torque compensator and the road wheel of the vehicle.

DRAWING REFERENCE NUMERALS

Figure 8:
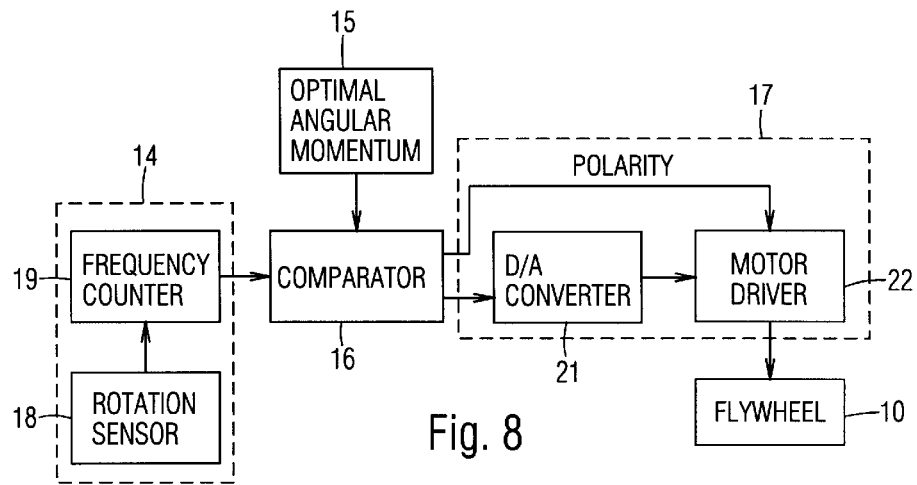
FIG. 8 is a block diagram of the torque compensator in accordance with one embodiment of the invention.

| | |
|---|---|
| 10. Flywheel | 11. Steering Fork |
| 12. Motorcycle | 13. Front Road Wheel |
| 14. Angular Momentum Detector | 15. Optimal Angular Momentum |
| 16. Comparator | 17. Flywheel Driver |
| 18. Rotation Sensor | 19. Frequency Counter |
| 21. D/A Converter | 22. Motor Driver |
| 23. Integrator | 24. Differential Amplifier |
| 25. Differential Amplifier | 26. Voltage Reference |
| 27. Transistors | 28. Transistors |

DETAILED DESCRIPTION OF THE INVENTION

FIG. 4:

In accordance with a preferred embodiment of the invention shown in the side view of FIG. 4, a torque compensator includes a variable speed flywheel 10 mounted on a steerable portion or steering fork 11 of a motorcycle 12 Flywheel 10 provides a compensating torque that, depending on the speed of motorcycle 12, supplements or counteracts the torque of a steerable front road wheel 13. Flywheel 10, which is preferably a reversible DC electric motor, is arranged with its rotational axis parallel to the rotational axis of road wheel 13 The rotor of the electric motor functions as flywheel 10, which is controllable for rotation in the same direction as road wheel 13, or in the opposite direction by controlling the polarity of the supply voltage.

FIGS. 5–7:

As shown in the block diagram of FIG. 5, the torque compensator includes an angular momentum detector 14 for measuring the angular momentum of the road wheel. The angular momentum is measured by measuring the rotational speed of a road wheel or the forward velocity of the vehicle. Since the moment of inertia of the road wheel is predetermined, the angular momentum can be determined by the equation in FIG. 1. The measured angular momentum is compared against stored data representing an optimal angular momentum 15 by a comparator 16, which outputs a value representing the difference in angular momentum. The value indicates the magnitude of the difference, and whether the difference is positive or negative, i.e., whether the angular momentum of the road wheel is less or greater than the optimal angular momentum. The value is converted into a suitable driving voltage of the proper polarity by a flywheel driver 17 for driving flywheel 10, which generates the graph of $L_2$ shown in FIG. 6, the angular momentum of flywheel 10.

When the angular velocity W of the road wheel is equal to zero, i.e., when the vehicle is stopped, flywheel 10 is driven at a high speed to generate a momentum equal to $L_A$, the optimal angular momentum. When the angular velocity W of the road wheel is increased, but is still below the optimal angular velocity $W_A$, i.e., when the vehicle is traveling slowly, flywheel 10 is driven by flywheel driver 17 with a predetermined polarity, so that flywheel 10 is driven in the same rotational direction as the road wheel, but at a slower speed to generate a smaller amount of supplemental momentum. As the angular velocity of the road wheel approaches the optimal angular velocity $W_A$, flywheel 10 is driven at declining speeds to generate lesser supplemental momentum. When the road wheel is rotating at optimal speed, so that it is generating the optimal angular momentum, flywheel 10 is stopped because supplemental momentum is not needed.

When the road wheel is rotating so quickly that it exceeds the optimal angular velocity WA, flywheel 10 is driven by flywheel driver 17 with reversed polarity, so that flywheel 10 is driven in a direction opposite to the rotation of the road wheel to generate a counteracting or negative momentum. The speed of flywheel 10 is increased to generate greater counteracting momentum as the rotational speed of the road wheel is further increased.

As shown in the graph of $L_3$ in FIG. 7, the total angular momentums of the road wheel and flywheel 10 is kept constant at the optimal angular momentum $L_A$ throughout the entire speed range W of the road wheel. The sum of their torque, which is directly proportional to the sum of their angular momentums, is thus also kept constant at the optimal point at all times. Therefore, stability and steering sensitivity of the vehicle are optimized at all road speeds. The vehicle can be kept upright even when it is stopped by making slight steering adjustments, without having to put a foot on the ground.

FIG. 8:

A digital embodiment of the torque compensator is shown in the block diagram of FIG. 8. Angular momentum detector 14 comprises a rotation sensor 18 for detecting the revolution of the road wheel, and a frequency counter 19 which outputs a binary number that indicates the angular velocity of the road wheel. Stored optimal angular momentum 15 preferably comprises a look-up table that provides the proper flywheel speeds for the range of anticipated road wheel speeds. Such a look-up table is equivalent to storing the optimal angular momentum, because the optimal angular momentum must be taken into consideration when determining the compensating flywheel speeds.

The detected road wheel speed is compared by comparator 16 to the range of road wheel speeds in the look-up table, and the corresponding flywheel speed is selected and fed to flywheel driver 17, which is comprised of a D/A converter 21 and a motor driver 22. The binary flywheel speed generated by comparator 16 is converted by D/A converter 21 into a proper voltage, which is amplified by motor driver 22 for driving flywheel 10 to generate an angular momentum shown in the graph of FIG. 6. Comparator 16 also provides polarity information to motor driver 22 for controlling the direction of flywheel 10.

Figure 9:
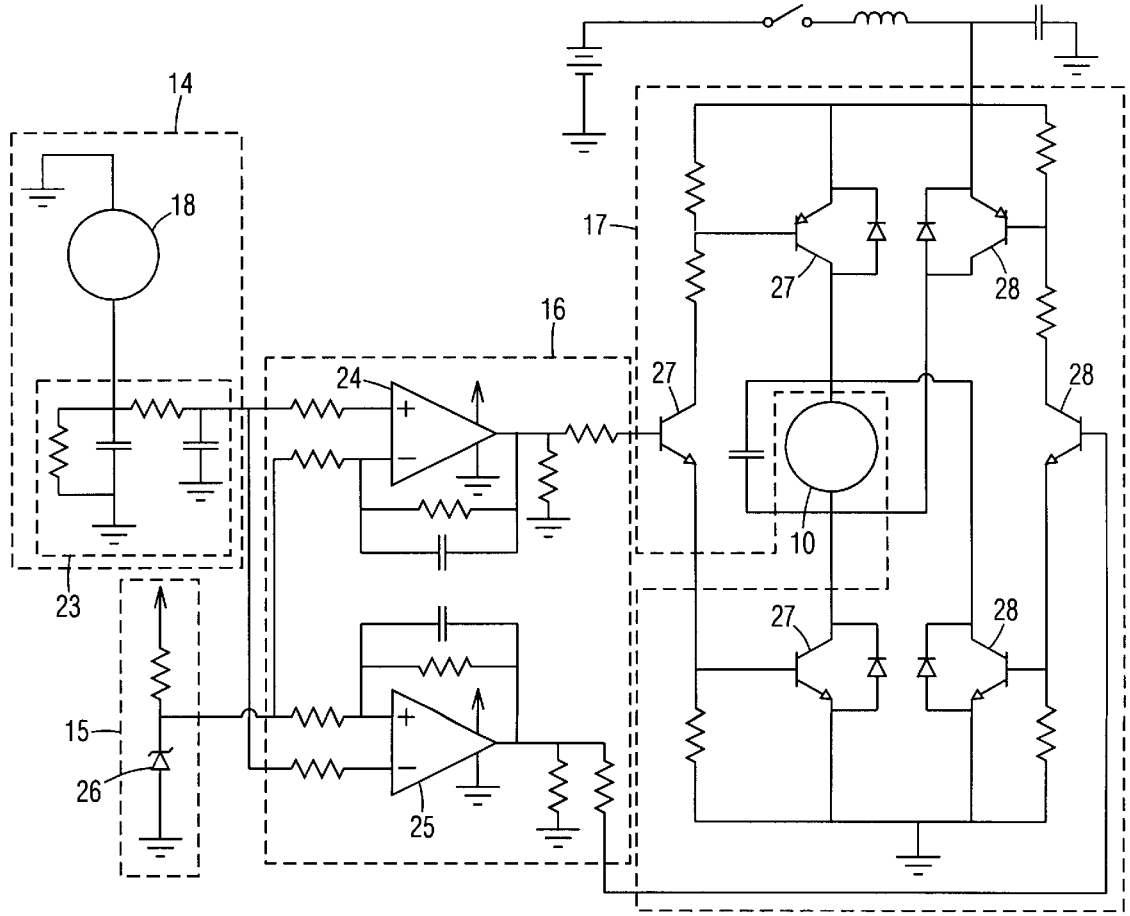
FIG. 9 is a circuit diagram of the torque compensator in accordance with another embodiment of the invention.

FIG. 9:

An analog embodiment of the torque compensator is shown in the schematic diagram of FIG. 9. Angular momentum detector 14 is comprised of rotation sensor 18, and an integrator 23. The pulses from rotation sensor 18 are converted by integrator 23 into an analog voltage which is generally directly proportional to the rotational speed of the road wheel. Comparator 16 is comprised of a pair of differential amplifiers 24 and 25, and optimal angular momentum 15 is comprised of a voltage reference 26 The voltage produced by integrator 23 is compared by comparator 16 to the voltage produced by voltage reference 26. Flywheel driver 17 is comprised of transistors 27 for driving flywheel 10 in one direction, and transistors 28 for driving flywheel 10 in the opposite direction.

When the voltage of integrator 23 is significantly below the voltage of voltage reference 26, i.e., when the road wheel is rotating slowly or stopped, transistors 27 are driven by differential amplifier 24 at a high voltage, so that flywheel 10 is driven very quickly in the same direction as the road wheel to provide supplemental momentum. As the voltage of integrator 23 is increased toward the reference voltage, i.e., when the road wheel is rotating more quickly, transistors 27 are driven by differential amplifier 24 at reducing voltages for driving flywheel 10 at reducing speeds. When the integrator voltage is above the reference voltage, i.e., when the road wheel is rotating faster than the optimal angular velocity, transistors 28 are driven by differential amplifier 25, so that flywheel 10 is driven in the opposite direction to the road wheel to provide counteracting momentum. Flywheel 10 is thus driven to generate an angular momentum shown in the graph of FIG. 6.

SUMMARY AND SCOPE

Accordingly, I have provided a torque compensator for a motorcycle that provides the optimal balancing torque regardless of the forward velocity of the vehicle. It provides the optimal stability and steering sensitivity throughout the entire speed range of the vehicle. It also eliminates the need for a rider to put a foot on the ground when the vehicle is stopped.

Although the above descriptions are specific, they should not be considered as limitations on the scope of the invention, but only as examples of the embodiments. Many substitutes and variations are possible within the teachings of the invention. For example, other analog or digital circuits may be used for sensing the rotational speed of the road wheel and adjusting the speed of the flywheel accordingly. Instead of using the rotor in an electric motor as the flywheel, a separate flywheel may be driven by the motor, so that an even more efficient flywheel may be used. The speedometer signal of the vehicle may be used as road wheel speed input. In addition to the front wheel, the torque compensator may be mounted on any other wheel. The torque compensator may be mounted on bicycles, and vehicles with more than two wheels, such as passenger cars. The torque compensator may also be mounted on the steerable front sled of a snowmobile, which will enable a smaller sled to be used. When mounted on a snowmobile, the speed sensor may be attached to the track rollers. Therefore, the scope of the invention should be determined by the appended claims and their legal equivalents, not by the examples given.

I claim:

1. A torque compensator for a vehicle, comprising:
   a variable speed flywheel with a horizontal spin axis for being attached to a steerable front supporting portion of said vehicle, said flywheel rotating at a speed generally inversely proportional to a speed of said vehicle for providing greater supplemental torque when said vehicle is traveling slowly, and for providing lesser supplemental torque when said vehicle is traveling more quickly; and
   an angular momentun detector connected to said flywheel and arranged for measuring an angular momentum of a road wheel of said vehicle and thus measuring said speed of said vehicle.

2. The torque compensator of claim 1, wherein said flywheel comprises an electric motor.

3. The torque compensator of claim 1, further including:
   stored data representing a predetermined optimal angular momentum;
   a comparator measuring a difference between said angular momentum of said road wheel and said optimal angular momentum; and
   a flywheel driver controlled by said difference between said angular momentum of said road wheel and said optimal angular momentum, said flywheel driver driving said flywheel at a high speed when said vehicle is stopped, and driving said flywheel at declining speeds when said vehicle is traveling at increasing speeds.

4. The torque compensator of claim 1, wherein said angular momentum detector comprises a rotation sensor for sensing rotation of said road wheel, and a frequency counter connected to said rotation sensor.

5. The torque compensator of claim 1, wherein said angular momentum detector comprises a rotation sensor for sensing rotation of said road wheel, and an integrator connected to said rotation sensor for producing a voltage generally directly proportional to an angular velocity of said road wheel.

6. The torque compensator of claim 3, wherein said optimal angular momentum is represented by a voltage reference.

7. The torque compensator of claim 3, wherein said comparator comprises a differential amplifier said differential amplifier controlling said flywheel driver so as to drive said flywheel quickly when there is a large difference between said angular momentum of said road wheel and said optimal angular momentum, and to drive said flywheel lowly when there is a small difference between said angular momentum of said road wheel and said optimal angular momentum.

8. A torque compensator for a vehicle, comprising:
   a reversible flywheel with a horizontal spin axis for being attached to a steerable front supporting portion of said vehicle, said flywheel rotating in one direction for providing a supplemental torque when said vehicle is traveling below a predetermined speed, said flywheel rotating in an opposite direction for providing a counteracting torque when said vehicle is traveling above said predetermined speed.

9. The torque compensator of claim 8, wherein said flywheel comprises an electric motor.

10. The torque compensator of claim 8, further including:
    an angular momentum detector for measuring an angular momentum of a road wheel mounted on said vehicle;
    stored data representing a predetermined optimal angular momentum;
    a comparator measuring a difference between said angular momentum of said road wheel and said optimal singular momentum; and
    a flywheel driver controlled by said difference between said angular momentum of said road wheel and said optimal angular momentum, said flywheel driver driving said flywheel in a direction identical to a rotational direction of said road wheel when said angular momentum of said road wheel is less than said optimal angular momentum so that said flywheel provides a supplemental momentum, said flywheel driver driving said flywheel in an opposite direction relative to said rotational direction of said road wheel when said angular momentum of said road wheel is greater than said optimal angular momentum so that said flywheel provides a counteracting momentum.

11. The torque compensator of claim 10, wherein said angular momentum detector comprises a rotation sensor for sensing rotation of said road wheel, and a frequency counter connected to said rotation sensor.

12. The torque compensator of claim 10, wherein said angular momentum detector comprises a rotation sensor for sensing rotation of said road wheel, and an integrator connected to said rotation sensor for producing a voltage generally directly proportional to an angular velocity of said road wheel.

13. The torque compensator of claim 10, wherein said optimal angular momentum is represented by a voltage reference.

14. The torque compensator of claim 10, wherein said comparator comprises a differential amplifier.

15. A torque compensator for a vehicle, comprising:
    a variable speed reversible flywheel for being attached to a steerable portion of said vehicle;
    an angular momentum detector for measuring an angular momentum of a road wheel mounted on said steerable portion of said vehicle;
    stored data including a predetermined optimal angular momentum;
    a comparator measuring a difference between said angular momentum of said road wheel and said optimal angular momentum; and
    a flywheel driver controlled by said difference between said angular momentum of said road wheel and said optimal angular momentum, said flywheel driver driving said flywheel in a direction identical to a rotational direction of said road wheel when said angular momentum of said road wheel is less than said optimal angular momentum so that said flywheel provides a supplemental momentum, said flywheel driver driving said flywheel at a high speed when said vehicle is stopped, and driving said flywheel at declining speeds when said vehicle is traveling at increasing speeds up to a speed when said road wheel is rotating quickly enough to provide said optimal angular momentum, said flywheel driver driving said flywheel in an opposite direction relative to said rotational direction of said road wheel when said angular momentum of said road wheel is greater than said optimal angular momentum so that said flywheel provides a counteracting momentum, said flywheel driver driving said flywheel at increasing speed when said vehicle is traveling at increasing speeds above said speed when said road wheel is providing said optimal angular momentum.

16. The torque compensator of claim 15, wherein said flywheel comprises an electric motor.

17. The torque compensator of claim 15, wherein said angular momentum detector comprises a rotation sensor for sensing rotation of said road wheel, and a frequency counter connected to said rotation sensor.

18. The torque compensator of claim 15, wherein said angular momentum detector comprises a rotation sensor for sensing rotation of said road wheel, and an integrator connected to said rotation sensor for producing a voltage generally directly proportional to an angular velocity of said road wheel.

19. The torque compensator of claim 15, wherein said optimal angular momentum is represented by a voltage reference.

20. The torque compensator of claim 15, wherein said comparator comprises a differential amplifier.

* * * * *